United States Patent [19]

De Witt

[11] 3,787,187

[45] Jan. 22, 1974

[54] CONVERSION-CONTROLLED APPARATUS FOR POLYMERIZATION OF MONOMERIC MATERIALS IN LIQUID MEDIA

[75] Inventor: Elmer J. De Witt, Cuyahoga Falls, Ohio

[73] Assignee: The B. F. Goodrich Company, New York, NY

[22] Filed: Apr. 1, 1970

[21] Appl. No.: 24,476

[52] U.S. Cl.................. 23/285, 23/253 A, 23/290, 137/2, 260/92.8 R, 260/95 A, 260/94.9 P
[51] Int. Cl............................................. C08f 1/98
[58] Field of Search . 23/285, 253, 253 A, 252, 289, 23/290; 260/94.9 P, 95 A, 92.8 R; 137/2

[56] References Cited
UNITED STATES PATENTS
2,808,316   10/1957   Hall.................................. 23/252 R

FOREIGN PATENTS OR APPLICATIONS
354,581   7/1961   Switzerland

Primary Examiner—James H. Tayman, Jr.

[57] ABSTRACT

Improved apparatus for polymerizing liquid monomeric materials in liquid reaction media include a reaction vessel communicating with one or more liquid and/or vapor supply vessels and a pressure-sensing flow-control means associated with the reaction vessel which operates to control the supply of one or more liquids from the supply vessel or vessels to the reaction vessel in response to shrinkage of the charge therein attending conversion of liquid monomer to solid polymers as polymerization proceeds thereby maintaining the reaction vessel in an essentially completely-filled condition. A sensing device or devices such as a pressure- or weight-sensitive transducer associated with one or more of the supply vessels senses the weight or volume of liquid thus delivered to the reaction and is employed to initiate the addition from a supply to the reaction vessel of a liquid or gaseous short stop material yielding automatic and accurate termination of the polymerization reaction at a predetermined degree of conversion. Where two or more liquid supply vessels are thus employed, a proportioning device operated by the pressure-sensing flow-control means can be employed to effect a division of the total liquid delivered to the reaction vessel in any predetermined proportion between two or more different liquids such as between liquid monomers and aqueous medium or between two liquid monomers thus effecting control of the composition of the medium in the vessel as polymerization proceeds.

2 Claims, 1 Drawing Figure

CONVERSION-CONTROLLED APPARATUS FOR POLYMERIZATION OF MONOMERIC MATERIALS IN LIQUID MEDIA

A copending application, Ser. No. 812,044, filed Apr. 1, 1969 in the names of Claude H. Alexander and Willard F. Bixby now abandoned and refiled as copending application Ser. No. 172,294, filed Aug. 16, 1971, covers the process of polymerizing a liquid monomeric material including liquid vinyl chloride in which the shrinkage of the reaction mixture is sensed and employed to control and terminate the reaction. The instant application covers (1) an improved process of copolymerizing a mixture of at least two liquid monomeric materials utilizing charge shrinkage as a control and (2) an improved apparatus capable of carrying out both of such processes.

SUMMARY OF THE INVENTION

The present invention relates to improved apparatus for polymerizing liquid monomeric materials in liquid reaction media under significantly improved control. The present invention also relates to an improved process for the copolymerization of a mixture of two or more liquid monomers in a liquid reaction medium producing copolymeric products of improved quality at lower costs.

The apparatus of this invention includes a closed reaction vessel and one or more liquid supply or transfer vessels together with a new and novel controls system based on sensing both the minute-by-minute and final desired degree of conversion of the polymerization mixture as revealed accurately by the shrinkage in the volume of reaction medium produced by the conversion of liquid monomer or monomers to the polymeric state. This is accomplished by a high-low pressure-sensing control in communication with the reactor interior which operates or controls a flow control means delivering or transferring liquid from a supply vessel to the reactor refilling the same to an essentially constant volume and preferably to an essentially completely filled condition. The amount of liquid thus removed or transferred from the liquid make-up supply vessel is directly and most accurately related to the amount of liquid monomeric material which has polymerized. The apparatus of this invention includes means for sensing when any given degree of conversion has occurred (i.e. when any given amount of liquid has been so transferred) and the resulting intelligence or transfer control signal thus derived is employed to control the further steps of the process such as for example causing automatic shut-down or termination of the reaction when the desired final conversion has occurred, if necessary, by addition to the reactor of a catalyst-killer of "short-stop". Likewise preferred embodiments of the apparatus of this invention include proportional transfer controls which effect the automatic addition in proper proportion to the reactor as shrinkage of the reaction medium proceeds of more than one liquid, fluid or vaporous materials whereby the composition of the liquid reaction medium can be controlled or built-up or changed as needed during the progress of the polymerization reaction all in response to or controlled by conversion.

In the process of this invention, a mixture of at least two copolymerizable liquid monomeric materials is copolymerized in a liquid reaction medium commencing the reaction with the reaction media containing the monomeric mixture in relative proportions yielding a desired copolymeric composition together with other necessary or desirable polymerization ingredients. As polymerization proceeds, make-up liquid material is added to the reaction medium to compensate for shrinkage of the reaction medium attending conversion of monomer from the liquid monomeric to the copolymeric state. Such make-up liquid includes at least said copolymerizable liquid monomeric materials in relative proportion insuring the presence of the monomeric materials at the locus of reaction in proportion insuring formation of the desired copolymeric composition. The method thus employs shrinkage of the reaction medium or monomer conversion to control the copolymerization of a mixture of monomeric materials in a manner much more precise than heretofore possible producing copolymer products of a much more uniform composition and of significantly superior quality.

The method of this invention is equally applicable to reaction systems which produce either a copolymer insoluble in the reaction medium or a copolymer soluble in the reaction medium. Insoluble copolymer systems can be either of the suspension or slurry type or of latex or dispersion type. The method of this invention is peculiarly well adapted to the more complex aqueous copolymer latex systems since the precise control allows control not only of monomer composition at the locus of reaction but also of the other composition-controlled variables such as particle size and shape, particle size distribution, soap or dispersant coverage, pH, catalyst concentration, etc. which are so important in aqueous latex systems. For example, the liquid make-up material can contain or include in addition to monomers, water, soaps and dispersants, pH buffers, catalysts, molecular weight control agents (sometimes called chain-transfer agents), and many other polymerization adjuvant materials. Such make-up liquid can be added in one or more separate streams the composition of each of which is adjusted for a specific purpose.

One such liquid stream may consist of an aqueous solution of a dispersant or mixture of dispersants in such concentration that continued addition of such stream builds dispersant levels in the reaction medium at a rate not only directly proportional to the increase in polymeric content but also increasing as total particle surface area increases more slowly in the later stages of reaction. Another stream, or the same such stream, may contain a solution or dispersion of catalyst.

While both the apparatus and process of this invention can be operated with an incompletely-filled reactor by maintaining a constant volume of reaction mixture and sensing the amount of liquid required to maintain said constant volume, the determination of level in closed metal reactors is not without difficulty and such a mode of operation still suffers from the effects of the vapor/liquid interface. Operating with completely filled reactors reduces the measurement of the shrinkage to the simple act of measuring the total liquid volume so added and thus transfers the locus of such an important measurement outside the reactor. Heretofore, operating completely filled reactors without control means as precise as provided by the apparatus of this invention has not been considered practical nor sufficiently safe for widescale commercial adoption.

Such preferred manner of operation is most easily and predictably carried out in a batchwise manner although it could be carried out in a continuous manner with more highly sophisticated integrated controls capable of sensing, measuring and generating difference signals accurately related to the difference in the volumes of liquid required, on the one hand, for (1) replacing shrinkage and (2) for supplying the motive power for moving the materials from the entrance to exit of the reactor system.

BACKGROUND OF THE INVENTION

The great bulk of monomers are homopolymerized and mixtures thereof copolymerized in a liquid diluent medium, most usually an aqueous medium. Most of the known and well-used processes and polymerization techniques suffer from defects principal among which is a lack of knowledge of the actual state or rate of the reaction (and conversion of monomers) and/or the condition of the reaction medium at any given moment in the reaction cycle. As a result control of both the reaction rate and/or the composition of the reaction medium has been highly imprecise making for the wide charge-to-charge variation in product quality. In the preparation of copolymers such imprecise control has been especially onerous since it has required reactor operators to operate their equipment to an assumed or calculated reaction schedule with only a few widely scattered tests such as a time-consuming total solids determination so seriously lagging the actual progress of the reaction that control measures often are applied too late to avoid loss of product quality.

A second defect has been the tendency, based on supposed safety requirements, to operate with incompletely filled reaction vessels thereby inherently creating a vapor/liquid interface where deposition of polymer is almost always especially severe. Such deposits in many cases must be removed after every charge at a significant expenditure of labor and equipment downtime and even though regularly removed are a source of contamination of product in subsequent charges.

The apparatus and process of this invention solves the above and other problems in polymerization and produce a better quality polymeric product at lower cost.

DETAILED DESCRIPTION

Most liquid monomeric materials have a density lower than that of their respective homopolymers and, the more regular the structure of the homopolymer the higher its density. When monomers are copolymerized, the density of the copolymer will usually be intermediate in density of the homopolymers of the individual monomeric constituents and also in all cases more dense than the corresponding mixture of liquid monomers. Some halogen-containing monomers, and particularly vinyl chloride, produce quite dense polymers. For example, liquid monomeric vinyl chloride has a literature reported density at 0°C of 0.9195 gram/ml whereas common grades of polyvinyl chloride have a density at 25°C in the neighborhood of 1.4 grams/ml and the more crystalline polyvinyl chlorides may be still more dense. Few monomer/polymer systems suffer such a large increase in density. Not all of this large increase in density is achieved in a copolymer of vinyl chloride in admixture with one or more other comonomers but the increase is nevertheless significant and easily observable. In monomeric mixtures in which vinyl chloride constitutes a major constituent the increase in density (and therefore also the shrinkage of the charge) is still very appreciable in all cases. The actual shrinkage which should obtain with any comonomeric mixture can be calculated mathematically with considerable accuracy from known density values. In general, the method and apparatus of this invention are operable with monomeric materials which incur at least a 10%/volume shrinkage on conversion to polymeric form since lower shrinkage values limit the volume of liquid or liquids which can be added to the charge and approach the limits of accuracy of practical volume or flow sensing elements which are available. Too low a shrinkage, for example, will limit the amount of liquid monomeric material which can be added to the reactor thus limiting the percent conversion obtainable.

The nature of the liquid medium in which the polymerization is conducted has very little effect on the shrinkage observed. However, it is known that certain solution phenomena can, in the case of a polymerization conducted in an efficient solvent for thee polymeric product, increase the apparent shrinkage over that obtained from the same monomeric material in a non-solvent medium. In the latter cases the process operators have a somewhat greater shrinkage volume to work with.

A surprising observation of vinyl chloride copolymer resins made by the conversion-controlled process of this invention is that they often are more stable, sometimes much more stable than a corresponding copolymer resin made by any other aqueous polymerization technique. We have found that when the process of this invention is operated with a completely-filled reactor and with at least an excess of liquid monomeric vinyl chloride present in the reactor at all times, and most preferably under conditions of vinyl chloride saturation throughout the reaction cycle, the resulting vinyl chloride copolymer resin will possess a markedly superior stability to heat and light than if made by more conventional techniques.

The shape of the individual latex particle in a vinyl chloride copolymer latex made by the process of this invention under vinyl chloride saturation conditions differ from those of latices made in other ways, being more spherical in shape. Such spherical latex particles shape is believed to be responsible for the 10 to 20 percent lower emulsifier levels required in such a latex for a given latex stability.

When the process of this invention is employed to produce copolymer resins, the instantaneous monomeric composition of the copolymer is determined only by the composition of the monomeric materials at the locus of polymerization (i.e. in the growing resin chains or particles, per se). For example, it has been found that to produce a copolymer of vinyl chloride and ethyl acrylate having a uniform composition of about 90%/wt. of combined vinyl chloride and about 10%/wt. of combined ethyl acrylate one must carefully and most accurately maintain a monomer composition in the reaction mixture throughout the reaction period of about 99.5%/wt. of vinyl chloride and only about 0.5%/wt. of ethyl acrylate. In this monomer combination the ethyl acrylate enters the growing copolymer chains much more readily than does vinyl chloride.

In other vinyl chloride copolymer systems the comonomer or comonomers may either tend to enter the chain more readily or less readily than does vinyl chloride, and in some cases, such as for example styrene, the comonomer or comonomers may, in fact, evidence a greater tendency to homopolymerize or polymerize not at all rather than to enter the desired copolymer chains. In any of these situations, a portion of one or more of the faster or difficult-to-copolymerize monomers is withheld and added to the reactor over the course of the reaction at a rate proportional to the actual rate (i.e. not an assumed or calculated rate) of reaction, i.e., to the rate of shrinkage in the charge. Such added monomer may comprise all or a portion only of the liquid required to replace shrinkage losses. In the case of the above-described 90/10 vinyl chloride/ethyl acrylate copolymers, the reactor may be charged initially with the 99.5/0.5 mixture and a 90/10 vinyl chloride/ethyl acrylate mixture added at a rate directly proportional to rate of shrinkage of the charge.

In any of these procedures, when either the desired weight of copolymer has formed or in case of a copolymer latex the resin particles have reached a predetermined average size a polymerization killer or shortstop is added and the addition of the monomer mixture terminated followed by stripping and/or recovery of the excess monomers and then by the usual work-up procedures. The copolymer product made in this fashion is most uniform in composition, has a heat stability significantly greater than a similar copolymer made by older procedures wherein the monomers are polymerized in a shrinking reaction medium to which monomers may or may not be added at a uniform rate based on a calculated or a merely assumed length of reaction time, and in latex-style systems, the resin is present in a predetermined average particle size, and, if desired, to a predetermined particle size distribution.

In the preparation of copolymer latices which in most cases desirably are produced so as to be composed of uniformly large latex particles, control of particle size has heretofore required careful control of emulsifier concentration throughout the reaction and, in some cases, by employing a "seed latex" of small uniform particles of a known size and controlling emulsifier coverage on such particles so as to suppress new particle initiation. It has also been found that the monomer composition and concentration present in all stages of the reaction, but especially early in the reaction, also exerts a large effect not only on the number and size of latex particles formed but also on the "shape" of the particles and hence on latex rheology and the final particle size distribution of the final latex product. The various comonomers vary in their effect on latex particle initiation. This variable is not easily subject to control in a reaction conducted in a shrinking charge since the monomers, especially the volatile vinyl chloride, distributes itself between the liquid and the steadily growing vapor space in the reactor making for unknown and uncontrolled vinyl chloride concentration at the locus of reaction. In a reaction carried out by the method of this invention, however, the vapor space is either eliminated or maintained constant and since an accurate readout of conversion is available at all times, it is possible to maintain in the reactor, especially during the early stages of reaction, a selected composition and concentration not only of emulsifier but also of a particular monomer composition found to favor the formation of the desired number, size and shape of latex particles. This is easily accomplished by charging a portion only of the total monomers initially and adding, during the early stages, a monomeric material or mixture of monomers found to produce the desired number and size or particles and, if desired during subsequent stages, readjust the rate and composition of added monomers to yield a resin of the desired composition while still controlling emulsifier coverage to suppress new particle initiation. Since the proportion of liquid monomeric material at the start of the reaction can be made especially high relative to the newly-initialled latex particles, early polymerization actually proceeds by forming copolymer dissolved in the dispersed monomer solution, thereby forming the early latex particles in a substantially spherical shape which is largely retained throughout the reaction. The examples below demonstrate the above and other latex-style applications of the process of this invention.

In all of these applications of the full-reactor embodiment of this invention there are other most surprising benefits. One of these is that the polymerization rate with a given polymerization recipe and a given catalyst concentration usually is appreciably faster than with a more conventional manner of operation. In many cases, catalyst levels may be reduced significantly.

Another advantage of the full-reactor version of this invention is a very significant increase in equipment productively. Such increase results partly from a more complete usage of the full reactor volume (i.e. no vapor space), partly from the ability to cool the reactor top surfaces thereby increasing active heat-removing area, and partly from shorter reaction cycles.

Still another advantage of the apparatus and process of this invention is a reduction in the build-up of solid polymer on the internal surfaces of the reactors and in the proportion of coagulum or non-standard resin forms in the product. By way of example, in the preparation of a vinyl chloride copolymer latex in a 3,000 gal reactor, older procedures produce on filtration of the latex as much as 100 lbs. of coagulum per charge whereas when produced by the process of this invention the coagulum may be as low as about 1 pound. The reasons for these observations are not fully understood. With elimination of the vapor space at the top of the reactor, condensation of liquid monomer on a cool reactor head surfaces is eliminated reducing polymer build-up in this area. It is also believed that elimination of such monomer condensation on reactor head surfaces reduces non-standard resin forms in the charge caused by liquid condensed monomer dripping or running down into the reaction mixture.

MONOMERIC MATERIAL

The apparatus of this invention is applicable to the polymerization of any monomer-containing polymerization mixture which, on conversion to the polymeric state, undergoes at least a 10 percent shrinkage in volume. Thus, the apparatus is useful in the polymerization of a wide range of mono-vinylidene monomers including the vinyl halides such as vinyl chloride, vinyl bromide and vinyl fluoride; the vinyl esters such as vinyl acetate, vinyl propionate, and others; the alkyl esters of acrylic acids such as methyl acrylate, ethyl acrylate, butyl acrylate, 2-ethylhexyl acrylate, methyl methacrylate and many others; the acrylic nitriles such as acrylonitrile, methacrylonitrile and others; the acrylic amides such as acrylamide, N-methylol acrylamide and others; vinyl and vinylidene aromatic monomers such as styrene, alpha-methyl styrene, the chloro-styrenes, vinyl naphthalene, and others; the aliphatic 1-monoolefins especially such monoolefins containing from 3 to 8 carbon atoms such as propylene, butene-1, hexene-1, octene-1 and others and many, many others. In addition, the apparatus may be employed in the polymerization polyolefinic hydrocarbons including the conjugated aliphatic diene hydrocarbons such as butadiene-1,3, isoprene, 2-ethyl butadiene-1,3, the alicyclic monoolefine and polyolefin hydrocarbons such as the cyclohexenes and the vinyl cyclohexenes, and mixtures of any two or more of the above, and many, many others.

The apparatus and the process of this invention is particularly well-adapted to the copolymerization of mixtures consisting of at least two liquid mono-vinylidene monomers in which vinyl chloride constitutes a major proportion (i.e. more than 50%/wt.). In context of this invention, the term "mono-vinylidene monomer" means a mono-unsaturated monomer in which the single carbon-to-carbon double bond is present in the terminal vinylidene structure Particularly preferred mono-vinylidene co-monomers for vinyl chloride are the vinyl esters, the alkyl acrylate esters, particularly the alkyl acrylates in which the alkyl group contains from 2 to 8 carbon atoms, vinylidene chloride, the acrylic nitriles, the acrylic amides, the aliphatic 1-monoolefinic hydrocarbons and particularly propylene, the aromatic monovinyl hydrocarbons such as styrene, vinyl naphthalene, and others, all such as is disclosed above and still others.

In both the conversion-controlled copolymerization process of this invention and in respect of the apparatus, it is preferred to employ a mixture of liquid mono-vinylidene monomers in which vinyl chloride constitutes at least 65 percent of wt. of the total.

The monomeric material, where appropriate, may contain non-monomeric additives such as monomer-soluble catalysts, molecular weight modifiers such as the alkyl mercaptans and the like all as is consistent with good practice in the art.

LIQUID POLYMERIZATION MEDIUM

Such medium will usually include a substantial proportion of a diluent liquid or mixtures thereof such as water, organic compounds such as liquid hydrocarbons, alcohols, esters of alcohols and glycols with the lower fatty acids such as those of formic and acetic acids, ketones, ethers, chlorinated hydrocarbons, and many, many others. From a process standpoint the diluent medium can be a good solvent for both the monomeric materials and the polymer or a non-solvent for either or both monomers and polymer. Diluents which are a nonsolvent for the polymer are preferred since they generally lead to more fluid reaction mixtures and better heat-removal capability. The most preferred liquid reaction medium especially for preparation of a vinyl chloride copolymer is an aqueous medium.

The preferred aqueous medium employed in the process of this invention may contain in addition to water any polmerization ingredient or adjuvant employed in polymerization including, without limitation, catalysts, antifreeze compounds, pH buffers, electrolyte salts, swelling agents, suspending and/or dispersing agents including the so-called colloidal suspending agents such as gelatin, tragacanth, polyvinyl alcohol, polyacrylic acid and/or its salts, clay, hydrated metallic oxides, and many others of both natural and synthetic origin, and dispersing agents such as soaps and the synthetic saponaceous materials such as the alkyl or alkaryl sulfates and sulfonates and their salts, and others. Catalysts may include the water-soluble types favored for latex-type systems such as potassium persulfate, oil- or monomer-soluble types favored for pearl-style systems such as caprylyl peroxide, isopropyl peroxy percarbonate, and others, and the oxidation-reduction or "redox" types, and many others. The process of this invention imposes no more of inherent limitation on the composition of the reaction medium than does any other aqueous polymerization process.

POLYMERIZATION TEMPERATURES

Polymerization according to the process of this invention may be carried out at any temperature practical with the monomeric material in question and will range, in general, from about −10°C up to about 100°C, although temperatures between about 5°C and about 75°C are most preferred because of more modest pressures obtaining in this range.

POLYMERIZATION PRESSURE

Polymerization according to the process of this invention may be carried out at any pressure at which the monomeric material, or at least the vinyl chloride content thereof is in the liquid state. Generally, the pressure will be just slightly above the autogenous pressure due to the monomers in the reaction mixture and will usually be in the range of from about 100 lbs/sq. in. to about 200 lbs/sq in. due to the preponderant proportion of vinyl chloride in the monomeric materials.

With the preferred completely-filled reactor embodiment of the process, the pressure should be in the range of from about 100 to 150 lbs/sq. in. (gauge) sufficient to insure that the monomeric material in the charge remains in the liquid state. It is recommended that new reaction vessels to be employed in this process be designed for at least 250 lbs/sq. in. pressure and more preferably for about 300 lbs/sq. in. pressure.

POLYMERIZATION PROCEDURE

In general, the process commences with a reactor purging step wherein the empty reactor is freed of oxygen and air, and in the full reactor embodiment, of any vaporous and/or inert vapor or gas by evacuation or by fluid displacement from the sealed reactor. In many cases, the monomeric vinyl chloride or a portion thereof may be charged first and at least a small portion of vinyl chloride vapor drawn off as a final purge before addition of the aqueous phase is begun. It is advantageous, especially in pearl-style polymerizations to dissolve a monomer-soluble catalyst in the vinyl chloride at this stage to insure uniform distribution thereof and eliminate any induction period required when the monomer must extract catalyst from the aqueous phase.

The aqueous phase is then added, in some cases as a pre-mixed and de-aerated solution containing suspending and/or dispersing agents, electrolyte salts, latex "seed", catalysts (if water-soluble types are to be utilized), and any other water-soluble or water-suspended ingredient of the recipe. In the full reactor embodiment of the process, the addition of the aqueous medium should be carried out so as to insure against entrapment of inert gases and/or vapors at the top of the reactor.

The entire charge is agitated efficiently upon the addition of the aqueous phase and thereafter throughout the reaction cycle. When necessary, heat may be supplied to the charge to initiate the polymerization reaction after which cooling is applied so as to maintain an essentially constant temperature in the range recited.

Once polmerization of the monomeric material commences, the volume in the reactor will begin to shrink.

The liquid level in such shrinking charge can be detected for example, by a radio-active cobalt level detector mounted externally near the top of the reactor or even more crudely by means of a calibrated sight glass gauge and liquid make-up material added to maintain a constant level. As indicated the superior embodiment involves maintaining the reactor in an essentially fully-filled condition by adding liquid to replace the volume lost by shrinkage in the monomer phase. This transfers the measurement of the liquid added to a location exterior of the reactor and thereby improves the accuracy and ease of determination. The addition of make-up liquid is easily accomplished in a number of ways such as by pumping the added liquid or liquids to the reactor through recording flowmeters or much more simply and reliably by providing one or more separate makeup liquid supply tanks arranged so the liquid from one vessel can be made to flow either directly to the reactor or to one or more of the other vessels displacing liquid therefrom into the reactor. With such a system one vessel registers the total of all liquids added to the reaction vessel.

Where two or more separate liquids are to be added during the course of the reaction in a desired proportion, such liquids may be preblended in the required proportions and stored in the separate charge vessel. Where the liquids to be added may be at least partially immiscible, as when both monomer and water are to be added, the monomer can be emulsified in the water and the emulsion added as make-up liquid. Where the latter procedure cannot be employed as when a suspension polymerization is being carried out, then separate supply vessels must be provided for aqueous and monomeric additives and means provided to effect addition of a separate stream of each liquid additive in the desired proportions. Such separate supply vessels can be supported on recording weight scales to obtain accurate confirmation of the actual amounts of liquids delivered.

As the polymerization commences, it is essential to have in the reaction medium a significant proportion of the total monomer to be consumed in the reaction and thereby provide sufficient potential shrinkage as to permit addition of sufficient make-up liquid during the reaction to accomplish both the scheduled build-up of the charge and the attainment of the desired final polymer solids level in the charge. In homopolymerization this presents no particular problem but in copolymerization is complicated especially by copolymer systems where at least one co-monomer has a tendency to enter the copolymer either much faster or much slower than the other monomeric components. In these instances, it is usually necessary to withhold a portion of the faster-reacting comonomers at the start and add the withheld portion over the course of the reaction in response to conversion. Where the withheld monomer constitutes a major proportion of the total monomeric mixture one will encounter difficulty with insufficient shrinkage of the charge because of too small an initial charge. In these cases, and where it may be desired to operate at high solids levels, it may be desirable to withdraw a quantity of reaction medium proportional to conversion in order to permit the addition of a liquid volume greater than permitted by shrinkage alone. An example of the latter would be in the copolymerization of vinyl chloride with fast-to-homopolymerize, difficult-to-copolymerize comonomers such as vinyl aromatic monomer such as styrene or a substituted styrene or with a conjugated 1,3-diene such as butadiene. Since one must keep the concentration of such comonomers in the reaction medium very low in order to insure copolymerization, it would be difficult to make copolymers rich (i.e. up to 50%/wt. in copolymer) in the difficult-to-copolymerize monomer were one to rely on conversion produced shrinkage alone.

Thus, one must often commence a copolymerization reaction with an initial charge of monomeric materials which react forming instantaneous copolymer of the desired combined monomeric content and in response to conversion add a monomeric mixture of composition which replaces the faster-reacting monomers at the rate at which they are consumed in forming the desired copolymer. In many cases make-up liquid should include diluent such as water. In the process and apparatus of this invention, one can effect conversion-controlled proportional addition of more than one stream of liquid with great accuracy and charge-to-charge repeatability as will be demonstrated herein.

In the preparation of vinyl chloride copolymers, it usually is desirable to maintain at least a small excess of liquid vinyl chloride in the reaction medium throughout the reaction in order to avoid vinyl chloride starvation and prepare a stable copolymer product. This too can be done with great accuracy in the process and apparatus of this invention.

When the desired degree of conversion of the monomers has been reached as indicated by the total amount (i.e. total weight or volume) of liquid added to the reaction, the addition of liquids is terminated and, preferably, a polymerization short stop added to the reactor in order to prevent further polymerization during blowdown, monomer recovery and polymer work-up, thereby preserving the polymer in the desired condition. Polymerization during work-up, might well involve exhaustion of the vinyl chloride content of the reaction mixture, or in a copolymerization of vinyl chloride copolymer mixture, involve exhaustion of the faster reacting monomer with the onset of homopolymerization of the remaining monomer. Termination of reaction in this manner with vinyl chloride copolymer resins will usually be required in the range of conversion below about 75 percent and most preferably between about 40 percent and about 65 percent.

The charge is then stripped of its residual unreacted monomer content by any known procedure as by vacuum stripping and/or heating to drive off the unreacted monomeric materials. In the production of vinyl chloride copolymer latices where the comonomer or comonomers are relatively less volatile than vinyl chloride, it may be necessary to strip off the vinyl chloride under reduced pressure and then pass the latex through a vacuum stripping (distillation) column to recover any residual higher boiling monomer.

Once stripped of the residual monomers the polymeric reaction products are worked up in the conventional manner by filtration washing and drying. Latices should be filtered and stabilized for use and/or shipment as such.

DESCRIPTION OF THE DRAWING

Figure 1:
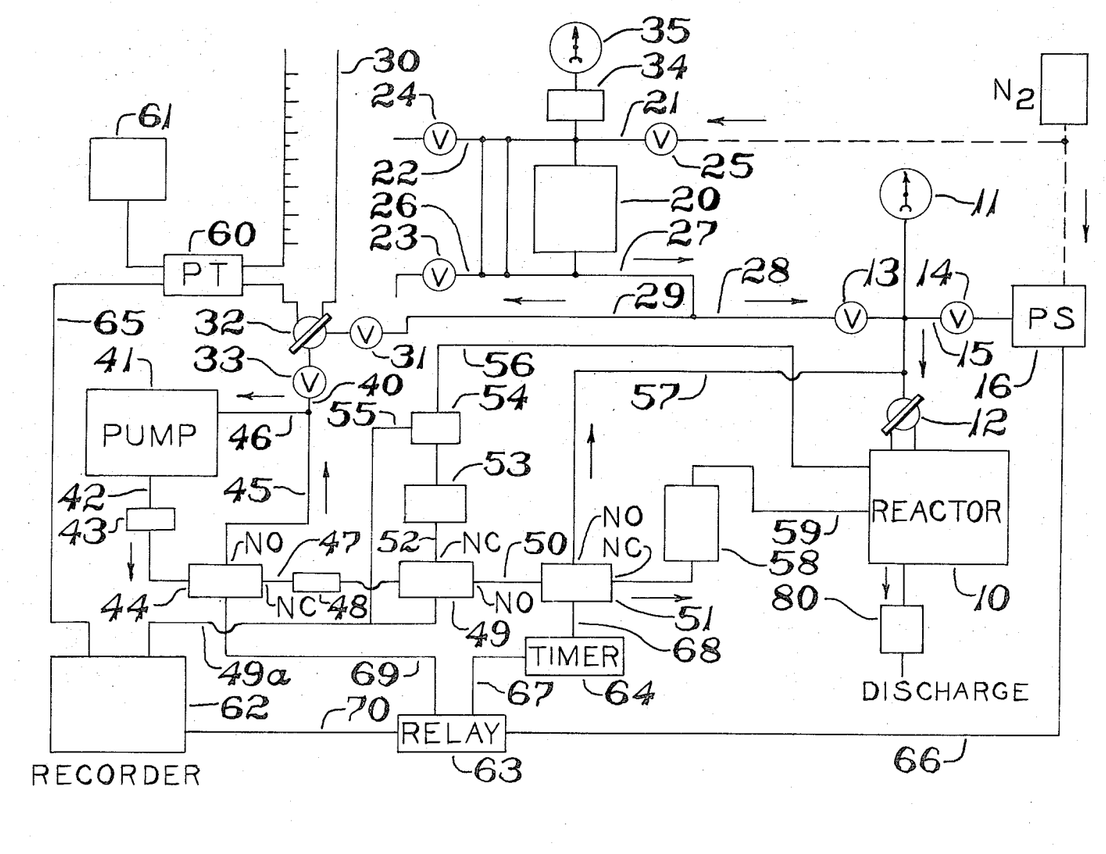
The FIGURE is a schematic or block diagram of a highly automated reaction equipment of this invention including the reactor itself, supply vessels, a pump, and all of the controls required (*a*) to proportion and deliver to the reactor the desired liquid or liquids in order not only to maintain the reactor in its fully-filled condition but also to maintain quite accurately in the reactor a reaction mixture of a precisely known composition and (*b*) automatically terminate the reaction at a desired or pre-selected conversion by addition of a catalyst killer or shortstop.

The invention will be better understood with reference to the drawing in which a reactor 10 is provided with a stirrer (not shown), a visual-type pressure gauge 11 and valves 12, 13 and 14. Line 15 connects the interior of reactor 10 with an externally mounted pressure switch 16 ("PS"), hereinafter "PS16" which in one embodiment is a mercury-filled U-tube provided with electrical contacts in each leg of the U so as to be closed by the mercury and thereby provide high/low operation over a small range (i.e. from about 2 to 10 psi gauge) of reactor pressures. Switch 16 would preferably be a Bourdon-type gauge provided with high-low limit switches. PS16 is provided with a source of high pressure nitrogen ("N$_2$") for balancing or centering the mercury level on each leg of the U when adjusting the electrode positions.

Water is supplied to the system on start-up from a main water supply tank 20 which is equipped with a nitrogen gas supply line 21 and a vacuum line 26 together with valves 23, 24 and 25 to allow water to be drawn into tank 20 through line 22 and then to be discharged therefrom under nitrogen pressure either through lines 27 and 28 to reactor 10 for initial filling, or when valve 13 is closed, through lines 27 and 29 to refill a calibrated liquid transfer vessel 30. When vessel 30 is filled, valve 31 in line 29 is closed and a two-way valve 32 and a shut-off valve 33 are opened to supply water through line 40 to the pump 41 and the automatic liquid transfer system to be described below. Water supply vessel 20 is supplied with a safety valve 34 and a gauge 35 to monitor the evacuation, filling and pressure discharge cycles of the system which are intermittent and manually controlled. The calibration marks on transfer vessel 30 can be employed to calibrate a recorder, see below.

Water from calibrated transfer vessel 30 passes through line 40 to pump 41, which runs continuously, and from thence the water is discharged through line 42 and safety valve 43 to a three-way solenoid-controlled valve 44 having a normally-opened ("NO") and a normally-closed ("NC") port as indicated. Hereinafter the appropriate port of such a valve will be referred to as, for example "NO44" or "NC44". When valve 44 is non-energized, the water delivered by pump 41 recirculates through port NO 44 and lines 42, 45 and 46.

When valve 44 is energized, the water is deflected through NC44 to line 47 and through a check valve 48 to a second three-way solenoid-controlled valve 49 also having NO and NC ports as indicated. In the non-energized condition of valve 49 water passes through NO49 into line 50 to a third three-way valve 51 having NO and NC ports as indicated. In the the non-energized position of valves 49 and 51, water passes through port NO49, line 50, port NO51 and pipe line 57 directly into the reactor 10.

In the energized position of valve 49 water passes through port NC49 through line 52 to a make-up liquid transfer tank or vessel 53 and liquid displaced from vessel 53 passes through a solenoid controlled on-off valve 54 and pipe line 56 to the reactor 10. Valves 49 and 54, unlike other flow control devices in the apparatus of the figure, are subject only to a single control, respectively through electrical conduits 49A and 55, by a limit switch adjustably mounted in the path of the pen-carrying mechanism of a recorder 62, see below, and constitute an override or shutdown system as will be described below. Vessel 53 may contain, as second makeup liquid material, a liquid solution of a short-shop. The energization of valves 49 and 54 can be effected at any time, or rather at any monomer conversion, by appropriate positioning of the limit switch in recorder 62. Vessel 53 could be replaced by a high pressure gas supply container containing a gaseous shortstop such as nitric oxide (NO) and in such case water as a displacement liquid is not required.

In the preparation of vinyl chloride copolymer it may be necessary or desirable to provide means for effecting addition of a liquid monomer or of a mixture of liquid monomers as a stream separate from the water addition stream of line 57, the drawing. This is accomplished in the apparatus of FIG. 1 by energizing three-way solenoid valve 51 causing water to pass through port NC51 to a monomer supply or transfer vessel 58. Liquid monomer in vessel 58 is thereby displaced through line 59 into the reactor 10.

The control system effectuates all of these options automatically when suitably set up. Such control system comprises mercury pressure-sensing switch PS16, a pressure- or weight-sensing transducer 60 ("PT") communicating with the water in reservoir 30, such transducer being powered by a power supply 61, a recorder 62 having as indicated above limit switch contacts (not shown) adjustably mounted on the back of the pen-carrying mechanism, and a relay 63 which is operated by PS16, relay 63 in turn energizing a timer 64. Transducer 60 transmits an electrical signal to recorder 62 through conductor 65 causing deflection of its pen mechanism, such signal being linearly-proportional to the static pressure or weight of water in the main water transfer vessel 30. As water is withdrawn from such reservoir in response to signals generated in PS16 operating relay 63 through electrical conductor 66, the amount so withdrawn is automatically, quantitatively and continuously recorded by recorder 62. The strip chart in recorder 62 is conveniently calibrated both in volume or weight of water withdrawn and also directly in %/wt. of monomeric material converted to polymer.

Thus, as the pressure in reactor 10 falls to the "low" or "on" position of PS 16, the latter energizes relay 63 through electrical conductor 66, the latter energizing three-way valve 44 through conductor 69 causing water to be delivered through NC44 either to liquid supply vessel 53 or through NO51 directly to the reactor 10. Relay 63 and valve 44 will remain energized until the pressure in reactor 10 rises to the "high" or cutoff point of PS16 when the relay is de-energized in turn de-energizing valve 44 and terminating for the moment the transfer of makeup water from vessel 30.

Relay 63 when energized also starts timer 64 and the latter operates valve 51 in a timed or pulsed off-on sequence with the ratio of the off:on time periods being pre-set to effectively proportion the amount of water coming from vessel 30 (or total volume of makeup liquid required for shrinkage compensation) between water added as such to the reactor through line 57 and monomers or other makeup liquid displaced from vessel 58 into the reactor through line 49. With this latter provision one can set timer 64 to effect delivery and desired ratio of monomer: water.

When the copolymerization reaction has run its course, the pen-carrying mechanism of recorder 62 trips the limit switch in its setting at the desired final conversion thereby energizing relay 63 and valves 51 and 54 shutting off the transfer of water and/or monomers to the reactor and directing water from vessel 30 through NC49 into vessel 53 displacing therefrom a shortstop solution or a mixed shortstop/stabilizer solution which kills the catalyst and terminates the reaction and/or stabilizes the polymer in the reaction medium. The charge of reaction material is then blown down by operation of a discharge valve 80.

The operation of the apparatus shown in the drawing will be further described with reference to an actual polymerization in which a vinyl chloride/ethyl acrylate copolymer is produced as a latex. The reactor 10 is charged with the polymerization ingredients including a sodium lauryl surfate dispersant and leaving just enough space at the top of the reactor for injection of the catalyst and for thermal expansion. The water is added to the reactor from water tank 20 by opening valve 13 and applying nitrogen pressure to tank 20 by opening valve 25. The calibrated water reservoir 30 is filled from tank 20 by closing valve 33 and opening valves 32 and 31 to cause water to flow from tank 20 through lines 27 and 29 to reservoir 30. Reservoir 53 is charged with a shortstop solution and safety valve 54 closed. Reservoir 58 is charged with the required amount of a mixture 98%/wt. of vinyl chloride and 10%/wt. of ethyl acrylate. A portion of the monomer, perhaps from 70-90%/wt. of the total monomer charge in the 99.5/0.5 proportion is already in reactor 10 when an aqueous solution of potassium persulfate catalyst is injected into reactor 10 and the stirrer turned on. The proportion of the total monomer in the reactor at the start is selected in the range stated to aid in forming the correct number and size of particles. A small amount of the vinyl chloride is bled off as a vapor purge through vacuum line 22 and the reactor topped off by starting pump 41 and setting switch 16 to open at about 125 lbs/sq. in. and to close at about 122 lbs/sq. in. The loss in pressure due to the bleeding operation actuates switch 16 and energizes relay 63 which in turn energizes valve 44 which closes and delivers water to the reactor through line 57. The recorder 62 and reservoir 30 are zeroed at this point which is the start of the reaction.

Timer 64 is programmed to maintain in reactor 10 essentially the same reaction composition as exists at the start of the reaction, namely a small excess of the 99.5/ 0.5 mixture of vinyl chloride and ethyl acrylate. Recorder 62 is programmed to terminate the reaction at about 65 percent conversion. As polymerization progresses, the conversion of the monomer to polymer caused reactor pressure to fall to 122 lbs/sq.in. closing switch 16 and the shrinkage volume is immediately replaced by the correct proportion of water and monomer. When the conversion reaches about 65 percent, the limit switch contacts on recorder 62 are closed and relay 63 and valve 49 are energized, deflecting water through NC49 into shortstop reservoir 53 and shortstop solution is displaced into the reactor. This causes a somewhat slow dying out of the reaction. If faster shortstopping is required, the limit switch contacts on recorder 62 could be used to trigger the release of a gaseous short-stop such as nitric oxide which is maintained under a pressure somewhat higher than that in the reactor thus insuring the introduction and dissolution in the reaction mixture of sufficient gas quickly to destroy the catalyst. In all cases, the equipment operator can monitor the progress of the reaction by reference to the conversion recorded by recorder 62 and adjusting the settings, as necessary, of switch 16 and timer 64.

The invention will now be more fully described with reference to several specific examples which are intended to be illustrative only and not as limiting the invention.

EXAMPLE I

In this example, a number of experiments are conducted in which liquid vinyl chloride and methyl acrylate are copolymerized in the equipment of the drawing in an aqueous suspension system utilizing the following materials present in the reactor at the start of the reaction:

| Material | Quantity |
| --- | --- |
| Water (distilled) | 2000 ml |
| Methyl cellulose (1%)* | 75 ml |
| Vinyl Chloride | 436.5 grams |
| Methyl acrylate | 13.5 grams |
| Di-isopropyl peroxy Di-carbonate (10%)** | 6 ml |

* 1%/wt. suspension in water
** 10%/wt. solution in hexane

The reactor is supplied with cooling water to maintain the reaction mixture at an essentially constant 50°C. Agitation is at 800 RPM.

In reservoir 58 there is placed a mixture of 120 grams of methyl acrylate and 70 grams of vinyl chloride and the remaider of reservoir is filled with water so that the liquid monomer floats on water. Pressure switch PS16 is set to operate relay 63 at 123 lbs/sq.in. and to deactivate it at 125 lbs/sq.in. Tank 20 and calibrated reservoir 30 are both filled with water, that in tank 20 being under 150 lbs/sq. in. nitrogen pressure. All lines are evacuated and filled with water prior to starting to charge the raw materials.

The reactor 10 is charged with the water and the methyl cellulose solution and then sealed and water at room temperature applied to the cooling surfaces thereof. The stirrer is then activated. A small amount of vinyl chloride is bubbled through the reactor to purge all air out of the reactor after which manual valves 13 and 31 are closed. Next, 13.5 grams of methyl acrylate are injected into the reactor followed by injection of the 436.5 grams of liquid vinyl chloride. Valves 12 and 14 must be open to activate PS16. The temperature of the cooling water is raised briefly until the reaction mixture is nearly 50°C. The pump 41 is then turned on and the reactor "topped off" with water from reservoir 30 delivered through line 57. The switch 16 is temporarily disabled and a small amount (i.e. 6 – 10 ml) of the reaction mix is removed by syringe and then the same volume of catalyst solution is injected by syringe. As polymerization proceeds, the reaction mixture shrinks and the reactor pressure falls below 123 lbs/sq.in. actuating switch 16 and triggering relay 63 which activates simultaneously valves 44 and 51, thereby replacing any free volume in reactor 10 with water from reservoir 30 and the monomeric mixture in reservoir 58. Such decrease in volume is recorded by recorder 62 in terms of cumulative amount of water withdrawn from reservoir 30. The following is a series of readings recorded during one such reaction:

| Time hr. | Grams H$_2$O pumped | Grams Monomers added | % Conversion |
|---|---|---|---|
| 0.5 | 7.3 | 6.9 | 3.6 |
| 1.0 | 18.5 | 17.6 | 8.8 |
| 2.0 | 44.0 | 41.8 | 19.9 |
| 3.6 | 4 ml Sample removed | | |
| 4.0 | 108.8 | 103.4 | 43.7 |
| 5.0 | 141.1 | 128.3 | 54.2 |

At the end of 5 hours the reaction is terminated by action of the recorder limit switch contacts energizing valve 49 introducing a shortstop solution from reservoir 53 killing the reaction. The reactor is blown down and the unreacted vinyl chloride released and passing the aqueous suspension through a filter cloth. The solid, resinous copolymer caught on the filter is washed on the filter with ethanol, then suspended in ethanol, filtered again and finally dried in a vacuum oven at 50°C under 10 mm Hg. vacuum for 16 hours. There is thus obtained 315 grams of a dry white resinous powder of unifrom particle sine. Since a total of 578.3 grams of monomer had been added to the reactor, the actual total weight of resin recovered amounted to a conversion of 55.2%/wt. as against the 54.3 percent indicated by recorder 62. Such copolymer product is of high quality.

EXAMPLE II

An apparatus similar to that of the drawing is employed in an experiment wherein 90 parts/wt. of liquid vinyl chloride and 10 parts/wt. of liquid ethyl acrylate are copolymerized in aqueous emulsion to produce a latex of a type which is usually placticized by addition to the latex of sufficient of an emulsion of di-2-ethylhexyl phthalate plasticizer to amount to a 35 parts/wt. of the plasticizer per 100 parts/wt. of copolymer solids. Such a latex is employed as a film forming latex and as a coating material. The overall or general polymerization recipe is as follows:

| Material | Quantity |
|---|---|
| Vinyl Chloride | 58.2 lb. |
| Ethyl Acrylate | 9.7 lb. |
| Tetrasodium pyrophospate | 211 grams |
| Potassium persulfate | 29.3 grams |
| Ammonia | 153 grams |
| Caustic (50%) | 192 grams |
| Emulsifier (100%)* | 694 grams |
| Demineralized Water | 74 lb. |
| Seed Latex** | 3.2 lb. |
| Temperature | 45°C |
| Agitation | 110 RPM |

*Sodium sulfonate type
**A vinyl chloride/ethyl acrylate copolymer latex containing small particles calculated to grow to about 1800A by end of the reaction.

A mixture of 46.3 lbs. of water, the potassium persulfate catalyst and seed latex are charged to the reactor, the reactor sealed and evacuated, purged with vinyl chloride vapor, and evacuated again. At the latter point the entire amount of liquid vinyl chloride are added and the reactor and its contents brought up to reaction temperature by supplying warm cooling water, if necessary. The reactor is then completey filled by forcing water in under pressure. An emulsion is premixed by combining and homogenizing the amount of emulsifier indicated, 27.7 lbs of demineralized water, and 9.7 lbs of liquid ethyl acrylate. Such emulsion is stored ready for use in a separate premix vessel under a nitrogen pressure of 130 lbs/sq.in. As polymerization progresses, the emulsion is pressured into the reactor at a fairly constant rate of 1 to 2 lbs/hr. to replace shrinkage. The pressure in the reactor ranges from about 125 to 135 lbs/sq.in. during this period. When a conversion of about 65 percent is approaching, as indicated by the amount of the emulsion added to the reactor, the addition of premix is terminated and a short-stop solution is added in a similar fashion under pressure.

The latex is worked up by venting off the unreacted vinyl chloride, filtering, adding the plasticizer emulsion and heating and stirring for about 1 hour. After removal of the latex from the reactor, examination of the reactor shows very little polymer build-up on its internal surfaces. Films 6 mils in thickness are cast from the plasticized latex product and samples of the copolymer resin are isolated by coagulation for heat stability and molecular weight evaluations. The table below lists such evaluations of the thus-prepared latex and resinous product in comparison with similar evaluations of (1) a plasticized "latex A", a similar vinyl chloride-/ethyl acrylate latex prepared by metering both monomers at a uniform rate into a shrinking charge over an arbitrary 42 hour reaction period and (2) a standard commercial plasticized latex of similar type ("Latex B") made by metering both monomers at a more or less uniform rate into a shrinking charge to secure a 25 hour reaction period.

| | Latex A | Conversion Controlled Latex | Latex B |
|---|---|---|---|
| Conversion | High * | 65% | High * |
| Potassium persulfate | 0.6 phm *** | 0.05 phm | 0.4 phm |
| Reaction Time | 42 | 13 | 25 |
| Heat Stability**(6 mil film heated at 300°F) | | | |
| 0 | 59 | 73 | 71 |
| 10 | 41 | 66 | 56 |
| 60 | 3.5 | 57.5 | 33.5 |

|  | Latex A | Conversion Controlled Latex | Latex B |
|---|---|---|---|
| Molecular weight | | | |
| $M_n$ | 19,000 | 73,000 | 35,000 |
| $M_w$ | 70,000 | 171,000 | 131,000 |
| $M_w/M_n$ | 3.68 | 2.36 | 3.74 |

*No shortstop employed
**Photovolt reflectance values, no stabilizer added
***phm means parts/wt. per 100 parts/wt. of total monomer Several very interesting advantages of the conversion-controlled saturated monomer technique are clearly shown by the above data. First, the very significant reduction in catalyst requirements is remarkable. Note also the shorter reaction time. Most outstanding, however, is the very much higher stability to heat shown by the conversion-controlled copolymer resin. In another test, the above-described experimental copolymer resin films, heated in air at 150°C are no darker in color after 5 hours of heating than is the film from latex B after heating at the same temperature for only 1 hour. It is not easy to secure an improvement in heat resistance of this magnitude by addition of the better resin heat stabilizers. Finally, and advantage not shown in the above table is that it was found necessary to reduce the emulsifier level of the conversion-controlled latex by 10 to 20 percent as compared to that of either Latex A or Latex B yet latex stability and surface tension of the former is similar. The reason for the lower emulsifier level is found on microscopic examination of the latex particles of the conversion-controlled latex, such particles being very nearly perfectly spherical in shape (and having a minimum surface are) whereas those of Latex A and Latex B have a less uniform shape and a relatively larger surface area.

Films are cast from a latex similar to that of the above experimental latex and made under saturated monomer conditions and the films are thoroughly evaluated along with latices similar to that of Latex A and Latex B. The physical properties and heat stability values are as follows:

perimental latex as compared to the films made from the latices made by more conventional shrinking charge polymerization techniques.

EXAMPLE III

In this example, the use of the apparatus of this invention in the homopolymerization of liquid monomeric vinyl chloride in aqueous suspension using the equipment of the drawing and the procedure of Example I except that all of the liquid vinyl chloride is added initially and shrinkage of the charge during polymerization is replaced with water only. To accomplish this valve 51 and timer 64 are deactivated. Each charge is terminated automatically at a desired conversion preset on the limit switch contacts of recorder 62. The general recipe employed in each of these experiments is:

| Ingredient | Quantity |
|---|---|
| Water | 2000 ml |
| Methyl cellulose (1% Sol)* | 50 ml |
| Vinyl Chloride | 500 ml |
| Catalyst (same as Ex.I) | 3 ml |
| Temperature | 50°C |
| Agitation | 800 RPM |
| Reactor Volume | 2.7 liters |

* Same as Example I

Tank 20 and reservoir 30 are filled with water. Reservoir 53 contains a solution of S-diphenylthiourea as a shortstop. The water and the solution of methyl cellulose suspending agent are added first to the reactor, the reactor sealed and evacuated, the agitator started, and a small amount of vinyl chloride bubbled through the evacuated reactor for purging purposes, and lastly all lines in the system are evacuated and then filled with water from reservoir 30. The entire quantity of liquid vinyl chloride is then added and the catalyst solution last. The reactor is brought up to about 50°C and the pump 41 started. Switch 16 is set to operate On at 123 lbs/sq.in. and Off at 125 lbs/sq.in. The controls system automatically "tops off" the reactor with water and this is recorded as the zero point. Throughout the reaction, the reactor is operated essentially completely filled as described. The table below lists the data. Each charge

STRESS-STRAIN AND HEAT STABILITY

| | Films dried at 212°F for 20 min | | | |
|---|---|---|---|---|
| | Ult. Tensile | Elong-% | 100% mod | 200% mod |
| Similar to Latex A | 2375 | 170 | 1710 | — |
| Experimental Latex of this Example | 2870 | 210 | 1610 | 2730 |
| | Films dried at 212°F for 10 min. and cured 10 min. at 225°F | | | |
| Similar to Latex A | 2630 | 210 | 1730 | 2570 |
| Experimental Latex of this Example | 3170 | 240 | 1655 | 2780 |
| | Films dried 212°F for 10 min and cured 10 min at 300°F | | | |
| Similar to Latex A | 3565 | 250 | 1810 | 2910 |
| Experimental Latex of this Example | 4175 | 290 | 1795 | 2900 |

Heat Stability — Photovolt Reflectance of films at 212°F for 10 min. and heated at 300°F for time indicated*

| | (0) | 10 min. | 20 min. | 30 min. | 40 min. | 60 min. |
|---|---|---|---|---|---|---|
| Similar to Latex A | 66 | 41 | 30.5 | 24 | 18 | 15 |
| Experimental Latex of this Example | 67 | 45 | 34 | 30 | 27 | 22.5 |

*Calibrated against a 10 mil standard film sample, reflectance=79.

The above data indicates consistently superior film physical properties and better heat stability of the films prepared from the conversion-controlled saturated experimental latex as compared to the films made from is blown down and the polyvinyl chloride resin product worked up, dried and weighed as described in Example I.

| Exp. No. | PVC* Isolated-g. | H₂O Pumped in | Ratio PVC/H₂O | Actual.** Conversion |
|---|---|---|---|---|
| 1156 | 157 | 79.2 | 1.982 | 31.4 |
| 1160 | 301 | 152.8 | 1.970 | 60.2 |
| 1170 | 295 | 148.6 | 1.985 | 60.5 |
| 1174 | 332 | 165.2 | 2.010 | 65.5 |
| 1168 | 354.5 | 174.2 | 2.030 | 70.9 |
| 1164 | 385.5 | 188.8 | 2.042 | 77.1 |
| 1158 | 443 | 213.2 | 2.078 | 88.6 |
| 1162 | 461 | 215.2 | 2.142 | 92.2 |

\* Polyvinyl Chloride
\*\* From dry weight resin recovered

The data above show an almost straight line relationship between percent conversion and volume of water added up to about a conversion of 60 to 65 percent. Above the latter point, the ratio PVC/H₂O increases somewhat due to unknown reasons. It should be noted that the data above about 70 percent conversion is obtained at higher conversion than normally is acceptable for polyvinyl chloride and the last fraction of yield in such cases is made under monomer "starvation" conditions. It is known, for example, that polyvinyl chloride will dissolve or absorb 30 percent of its own weight of monomeric vinyl chloride. It is also known that the amount of vinyl chloride monomer which dissolves in water at 50°C and 50 lbs/sq.in. (gauge) pressure is about 5.5 grams/100 grams of water. A plot of volume of water added to the reactor (corrected to 25°C) against the weight of polyvinyl chloride isolated, however, will accurately provide conversion information for any given repeatable system of recipe, temperature and reactor. It is noted that buildup on the reactor walls when operating as in this example is much reduced as compared to more conventional procedures. In a series of repetitive charges carried out in such apparatus in large commercial production reactors producing polyvinyl chloride pearl resins, it is also noted that the charge-to-charge variation in particle size, is very much smaller. Accuracy in the conversion at blowdown in such large scale operation averages within about 1 percent of target values.

EXAMPLE IV

Styrene and the nuclearly-alkylated and halogenated styrenes are among the more difficult monomers to copolymerize with vinyl chloride. As is indicated in U.S. Pat. No. 2,628,957, a monomer of this type is a strong inhibitor of the polymerization of vinyl chloride unless its proportion is kept very low, usually below about 10%/wt. of the total monomeric mixture and more preferably from about 0.5 to 4%/wt. Also a styrene-type monomer tends strongly to homopolymerize in preference to copolymerizing with the vinyl chloride. As a result, unless a very low concentration of the styrene monomer is maintained any polymeric product obtained is a highly non-homogenous mixture of copolymers and the homopolymers of vinyl chloride and styrene as shown by opacity, brittleness, low solubility in common solvents, difficult processability and quite modest physical properties. To make a true copolymer of commercially important properties, therefore, requires the addition of quite minute amounts of styrene to the reaction with great accuracy and precision as the latter monomer is consumed in copolymerization. The apparatus of the drawing accomplishes this by proportioning water from transfer vessel 30 and styrene from vessel 58 while timer 64 maintains a rather high H₂O:-monomer ratio all in direct proportion to conversion or shrinkage of the reaction medium. Fortunately, vinyl chloride styrene copolymers over the range of from about 1 to 40%/wt. of combined styrene are obtainable within the range of styrene concentration at which copolymerization will occur. Best copolymers contain as combined comonomer from about 5 to about 30%/wt. of the styrene-type comonomer. Tabulated below are the general polymerization recipe and polymerization data on the copolymerization of vinyl chloride in aqueous emulsion with each of styrene, t-butyl styrene and monochlorostyrene:

INITIAL REACTOR RECIPE

| Water | 1700 ml |
|---|---|
| Emulsifier (10% Aq.Sol)* | 100 ml |
| Vinyl Chloride | 500 grams |
| Styrene Monomer | 4 to 8 ml |
| K₂S₂O₈ ** | 1.0 ml |
| Na₂S₂O₅(10%)** | 3.5 ml |
| Temp. | 45°–58°C. |

\* Sodium laurate type, several used
\*\* In some cases the SFS/NaFe/Versene redox type catalyst employed

| Styrene Monomer Employed | | Reaction Time (hr.) | Total* Water Delivered (ml) | Mon:** H₂O Ratio | Total Conversion (%) | Styrene Monomer Consumed (grams) | Combined Styrene Cont. %/wt. | Copolymer | | |
|---|---|---|---|---|---|---|---|---|---|---|
| | | | | | | | | Density 25°C | Cl %/wt. | Content DSV*** |
| 720 | Styrene | 6.4 | 103 | 2.5/11 | 82.8 | 52 | 11.5 | 1.3446 | 50.2 | 0.725 |
| 442 | " | 5.5 | 94 | 4/11 | 63.4 | 58.1 | 16 | 1.3250 | 48.2 | 0.497 |
| 446 | " | 21.3 | 9.25 | 5/10 | 64 | 70 | 18.2 | 1.3096 | 46.4 | 0.518 |
| 712 | " | 6.6 | 219.8 | 1.5/11 | 77.5 | 33 | 8.2 | 1.3590 | 52.1 | 0.532 |
| 774 | " | 18 | | **** | 59.8 | 157 | 37 | 1.2356 | 35.5 | 0.507 |
| 320 | Cl-Styrene | 20 | 157 | | 66 | 17.2 | 9.0 | 1.3784 | 53.9 | 1.056 |
| 315 | " | 20 | 164 | 3/13.5 | 68 | 47.6 | 13 | 1.3719 | 52.6 | 1.005 |
| 318 | " | 21 | 177 | 5/11 | 73 | 54 | 15.5 | 1.3631 | 51.8 | 0.919 |
| 322 | " | 18 | 163 | 8/8 | 68 | 86 | 25 | 1.3497 | 46.1 | 0.819 |
| 638 | t-butyl Sty | 19 | 268 | 1.5/13.5 | 97 | 25.5 | 4.2 | 1.3628 | 54.3 | 0.891 |
| 326 | " | 17.2 | 169.6 | 6/10 | 72.5 | 69 | 17 | 1.2897 | 47.0 | 0.861 |
| 291 | " | 16.5 | 222 | 7/7 | | 73.4 | 21 | 1.2697 | 44.8 | 0.759 |

\* From vessel 30
\*\* Setting of timer 64
\*\*\* Dilute solution viscosity (According to ASTM: D1243-66 at 30°C in 0.4% Cyclohexanone)

21

All of the latices obtained were freeze-coagulated and the coagulum worked up by water or methanol-washing and vacuum drying at 50°C. The products were clear plastics very easily processed by mill-mixing and sheeting procedures. All were soluble up to 30%/wt. in many common solvents for vinyl chloride polymers.

EXAMPLE V

Methyl methacrylate (MMA) and other alkyl esters of methacrylic acid in admixture with vinyl chloride polymerize so rapidly that the resulting copolymers are quite low in combined vinyl chloride content. Approximately equal proportions of vinyl chloride and methyl methacrylate (MMA) will produce copolymers containing about 95%/wt. or more of combined MMA until exhaustion of the latter monomer in the medium after which the vinyl chloride polymerize essentially as the homopolymer. As a result, unless the proportion of MMA in the reaction mixture is kept quite low, it is impossible to produce copolymers of any of the desired intermediate combined MMA contents. When the apparatus of the drawing is employed to effect the precise proportional addition of MMA, it is possible to produce true copolymers of a wide range of combined MMA contents. The recipe employed for a suspension-style copolymerization of vinyl chloride with MMA and butyl methacrylate (BMA) is given below along with polymerization and product data:

RECIPE

| | |
|---|---|
| Water | 2000 ml |
| Methyl cellulose (1%) | 50 ml |
| Vinyl Chloride | 210 grams |
| MMA | variable (290 grams; 0.5g; and 5 grams) |
| Catalyst (10% sol)** | 0.75 ml |
| Temp | 45°C |

*1% aqueous dispersion of "Methocel 90 HG"
** Isopropyl peroxy dicarbonate — 10% solution in hexane

22

RECIPE — INITIAL REACTOR CHARGE

| | |
|---|---|
| Water | 1700 ml |
| Sodium laurate (5% Sol. in Water) | 180 ml |
| Seqlene 540 (1%)[1] | 11 ml |
| Versene (1%)[2] | 11 ml |
| Sequestrene NaFe (1%) (3) | 5.5 ml |
| SFS (4) | 15 ml |
| Vinyl chloride | 500 grams |
| Butadiene | 5 ml |
| CHP (75%)[5] | 5 ml |
| Temp | 45°C |

[1]Seqlene 540 — Chelating agent sold by Pfaustiehl Laboratories Inc.
[2]Versene — Tetrasodium Salt of Ethylene-diamine-tetraacetic acid — sold by Dow Chemical Co.
[3]Sequestrene NaFe — Chelated Iron containing 13% iron — Sold by Geigy
[4]Formapon — Sodium Formaldehyde Sulfoxalate — Sold by Rohm and Haas
[5]Cumene Hydroperoxide After 21 hours of reaction during which time a total of 124.3 ml of water had been removed from vessel 30, the charge is worked up yielding 253 grams of a white powder which exhibits a density at 25°C of 1.3490 corresponding to a combined butadiene content of about 10 percent. The product contains unsaturation and can be cured by many rubber vulcanization agents such as peroxides. Such unsaturation enables one to employ the copolymer as a reactive polymer to which chemical groups are attached, for example, epoxy groups producing a self-stabilized resin.

I claim:

1. In an apparatus for polymerization including a closed reaction vessel and a plurality of auxiliary liquid supply vessels interconnected so as to maintain said reaction vessel essentially completely filled by liquid delivered from said auxiliary liquid supply vessels, the improvement which comprises a controls system in which each of at least two of said auxiliary liquid supply vessels are connected through its own liquid flow control means so as to deliver liquid directly to the interior of said reaction vessel with one of said two auxiliary liquid supply vessels being also connected to the other of said

| | Comonomer | Water Added | % Conversion | Reaction Time (hr.) | Copolymer Density at 25°C | Combined Comonomer %/Wt. | DSV |
|---|---|---|---|---|---|---|---|
| 1387 | MMA*58%/Wt | — | 38.6 | 27 | 1.1851 | 94.5 | — |
| 207 | MMA | 148.7 | 64 | 20 | 1.2949 | 30.1[1] | 0.560 |
| 244 | BMA | 233 | 94.5 | 18 | 1.3423 | 12.7 | 0.767 |

*Batch-charged Control Experiment
[1]mol % combined MMA

The resulting products are clear resins useful for many of the same purposes as other vinyl chloride copolymer resins.

EXAMPLE VI

The diolefin monomers are such powerful inhibitors of the polymerization of vinyl chloride that commercial vinyl chloride is sold under specifications either excluding diolefins entirely or limiting the proportion of dioleifins to very, very low levels. The apparatus of the drawing is employed to prepare such copolymer by charging all of the vinyl chloride and a very small proportion of butadiene to the reactor. putting about 100 grams of butadiene-1,3 in vessel 58 and carrying out the copolymerization by proportioning butadiene and water into the reactor in a ratio of 1.5/13.5. The initial reactor charge is as follows:

two auxiliary liquid supply vessels so as to deliver liquid to the latter displacing liquid therefrom into said reaction vessel and the said liquid flow control means associated with said one auxiliary liquid supply vessel being arranged to direct flow of liquid therefrom alternately directly to said reaction vessel and to said other auxiliary liquid supply vessel, a presettable high/low pressure sensing means communicating with the interior of said reaction vessel and having high and low pressure sensing contacts presettable respectively to high and low pressure conditions in said reaction vessel corresponding to the said essentially completely filled condition therein, said high/low pressure sensing means being connected to control the energizing of said liquid flow control means associated with said two auxiliary liquid supply vessels, a proportional timing device also energized by said high/low pressure sensing means and connected to operate said flow control means associated with said one auxiliary liquid supply vessel in a timed on-off alternating sequented manner effecting a desired proportional division of the total liquid delivered to said reaction vessel between liquid deliverd directly therefrom to said reaction vessel and liquid delivered to said other auxiliary liquid supply vessel displacing liquid from the latter into the said reaction vessel, a pressure-sensitive transducer communicating with said one auxiliary liquid supply vessel to sense withdrawal of the total liquid withdrawn therefrom, a presettable override means connected to be operated through said pressure transducer and arranged to be energized when a preset total of liquid has been withdrawn from said one auxiliary liquid supply vessel, an auxiliary fluid supply vessel having its own fluid flow control means and connected to deliver fluid into said reaction vessel, and said presettable override means also being interconnected with the various said liquid and fluid flow control means recited as, on arrival at its preset condition, do deenergize said liquid flow control means associated with said one auxiliary liquid supply vessel thereby terminating delivery of liquid to said reaction vessel and simultaneously to energize said fluid flow control means initiating flow of fluid from said auxiliary fluid supply vessel into said reaction vessel.

2. Apparatus as claimed in claim 1 and further characterized by said auxiliary fluid supply vessel being a vessel supplying a vapor under high pressure to said reaction vessel.

* * * * *

UNITED STATES PATENT OFFICE
CERTIFICATE OF CORRECTION

Patent No. 3,787,187            Dated January 22, 1974

Inventor(s) ELMER J. DE WITT

It is certified that error appears in the above-identified patent and that said Letters Patent are hereby corrected as shown below:

Col. 15, line 47, "54.3" should read --54.2--.
Col. 17-18, in the table, first "*" footnote, insert --dried-- after the word "films".
Col. 19, top of 5th column in the table insert --%-- before the word "Conversion"; in the table at the bottom, 4th column "9.25" should read --92.5--.

Signed and sealed this 17th day of September 1974.

(SEAL)
Attest:

McCOY M. GIBSON, JR.
Attesting Officer

C. MARSHALL DANN
Commissioner of Patents